United States Patent [19]

Karshens

[11] Patent Number: 4,991,891
[45] Date of Patent: Feb. 12, 1991

[54] REMOVABLE LOCKING SIDE GUARD FOR VEHICLE PROTECTION

[76] Inventor: Philipp G. Karshens, 1572 Mendocino St., Livermore, Calif. 94550

[21] Appl. No.: 326,513

[22] Filed: Mar. 21, 1989

[51] Int. Cl.⁵ .................................. B60R 19/42
[52] U.S. Cl. .................... 293/128; 70/258; 340/426
[58] Field of Search .............. 293/1, 102, 128; 70/258, DIG. 49, 424, 455; 24/633, 167; 340/426

[56] References Cited

U.S. PATENT DOCUMENTS

| | | | |
|---|---|---|---|
| 2,116,880 | 5/1938 | Dee | 24/167 |
| 2,594,491 | 4/1952 | Persons | 293/1 |
| 2,686,062 | 8/1954 | Schatzman | 293/128 X |
| 3,625,031 | 12/1971 | Alley, III | 70/258 |
| 4,002,363 | 1/1977 | James | 293/128 |
| 4,004,829 | 1/1977 | Kato et al. | 280/802 |
| 4,493,502 | 1/1985 | Campbell, Jr. | 293/128 |
| 4,546,345 | 10/1985 | Naito | 70/DIG. 49 X |
| 4,663,611 | 5/1987 | Humphrey | 70/DIG. 49 X |
| 4,674,303 | 6/1987 | Salcone, II | 24/633 X |
| 4,674,783 | 6/1987 | Hogan, III | 293/128 |
| 4,709,567 | 12/1987 | Appelbaum | 70/455 |

*Primary Examiner*—Dennis H. Pedder
*Attorney, Agent, or Firm*—Henry P. Sartorio

[57] ABSTRACT

A side guard for protecting vehicles is attached at its ends to recessed securing mechanisms located in the wheel wells or elsewhere in the vehicle body. The guard is a belt or tubular molding of rubber or plastic which can be locked into place to prevent unauthorized removal. The guard can be positioned and configured to provide maximum protection of the vehicle, is easy to attach and remove, and can be effectively locked in place. An electrical circuit formed in the guard can be connected to an alarm system. The locking mechanism can be electrically actuated by a vehicle locking system, e.g. by unlocking the door.

19 Claims, 1 Drawing Sheet

REMOVABLE LOCKING SIDE GUARD FOR VEHICLE PROTECTION

BACKGROUND OF THE INVENTION

The invention relates generally to the side protection of vehicles, and more particularly to removable side protection devices.

Automobiles and other vehicles typically have permanently attached side molding strips along the vehicle body to protect the vehicle from dents and scratches. Damage most often occurs in parking lots from the impact of opening doors from adjacent vehicles. The side moldings are of limited effect in protecting the vehicle because they are small in size and do not effectively cover the entire vehicle.

A number of different approaches have been taken to solve the problem of protecting the sides of vehicles, but with limited success. U.S. Pat. No. 4,498,697 to McGlone et al. shows a molded plastic or rubber tube which is magnetically attached to the side of a vehicle (which must be metal) and is secured by a wire clip which fits between the door and the door jamb. This device is limited to metal body vehicles and the securing clip would not prevent the tube from easily being removed. U.S. Pat. No. 4,707,008 to Falco shows a plastic or rubber body molding with magnets and suction cups for attachment to metal and nonmetal sides of vehicles and with a complex locking device which fits into the door jamb. The molding sticks to the vehicle side which is difficult when the car is wet, and the locking device is difficult to attach and can damage the door edge. U.S. Pat. No. Des. 228,752 shows a removable side guard which hangs from posts or pylons which project from the vehicle side. The protruding posts are objectionable and the side guard can be removed by anyone. None of the prior designs shows a side guard which is quick and easy to attach, in a predetermined location for maximum protection, on any type of vehicle, and which is easy to lock in place.

SUMMARY OF THE INVENTION

Accordingly, it is an object of the invention to provide an improved side protection guard for vehicles.

It is also an object of the invention to provide a side protection guard which locks in place and which uses a simple lock mechanism.

It is another object of the invention to provide a side protective guard which is adaptable to any vehicle and which can be positioned to optimize protection.

It is a further object of the invention to provide a side protective guard which is not physically attached to the vehicle side.

It is also an object of the invention to provide a protective side guard which is easy to attach and remove, does not detract from the appearance of the vehicle when removed, stays on the vehicle in all types of weather, and is relatively thief proof.

The invention is a removable guard to protect the sides of vehicles from dents and scratches attached to the vehicle by attachment means on the two ends of the guard which releasably engage recessed securing means mounted in the body of the vehicle. The securing means are recessed from the surface of the vehicle body and are typically mounted in the wheel well of the vehicle. The guard is a plastic or rubber belt or tube which contacts the vehicle principally at its ends near the securing means. The securing means can include locking mechanisms, and are placed in a predetermined position in the wheel well so that the guard is positioned to provide maximum protection. The body guard could be built into new cars or added on to existing cars. The body guard could also be wired to form a part of a security alarm system.

DETAILED DESCRIPTION OF THE PREFERRED EMBODIMENTS

Figure 1:
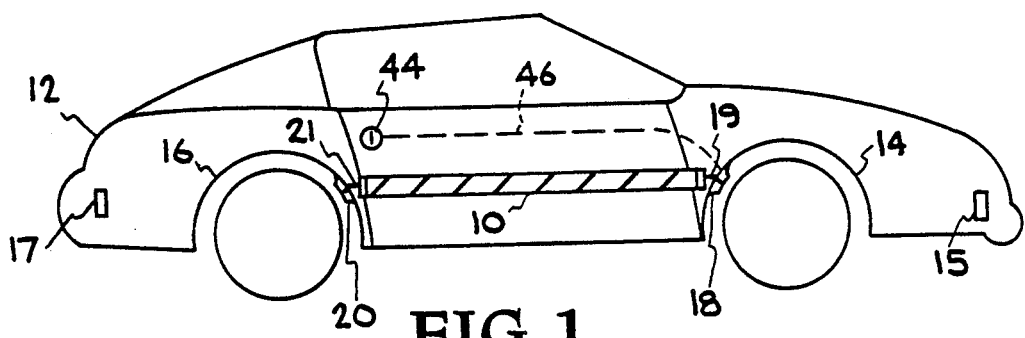
FIG. 1 is a side view of an automobile with an attached protective side guard according to the invention.

As shown in FIG. 1, protective guard 10 is attached along the side of vehicle 12, extending from front wheel well 14 to rear wheel well 16. Protective guard 10 is connected between front securing means 18 mounted in the front wheel well 14 and rear securing means 20 mounted in the rear wheel well 16. Guard 10 is connected to securing means 18 by attachment means 19, and to securing means 20 by attachment means 21. The positions of securing means 18, 20 and configuration of attachment means 19, 21 are chosen so that guard 10 is in the best position to protect the vehicle body. At least one of the securing means 18, 20 contain a locking mechanism so that the guard cannot be easily removed except by unlocking the locking mechanism. The guard 10 is only attached to the vehicle at the securing means 18, 20 so there are no connections along the length of the body which might themselves damage the car. Securing means 18, 20 are recessed from the vehicle body and are unobtrusive when not in use. Although the wheel wells are convenient locations for mounting securing means 18, 20, particularly on existing vehicles, they could alternatively be placed in small recesses 15, 17 formed in the vehicle body.

Figure 2:
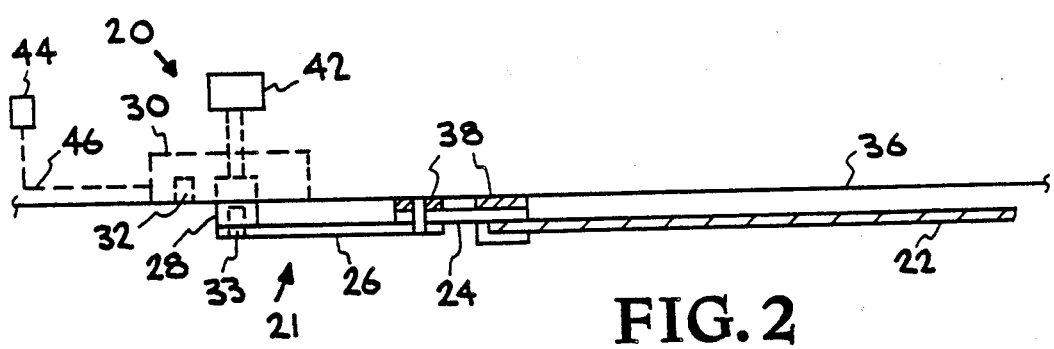
FIG. 2 is a top view of the side guard attached to the locking mechanism.
Figure 3:
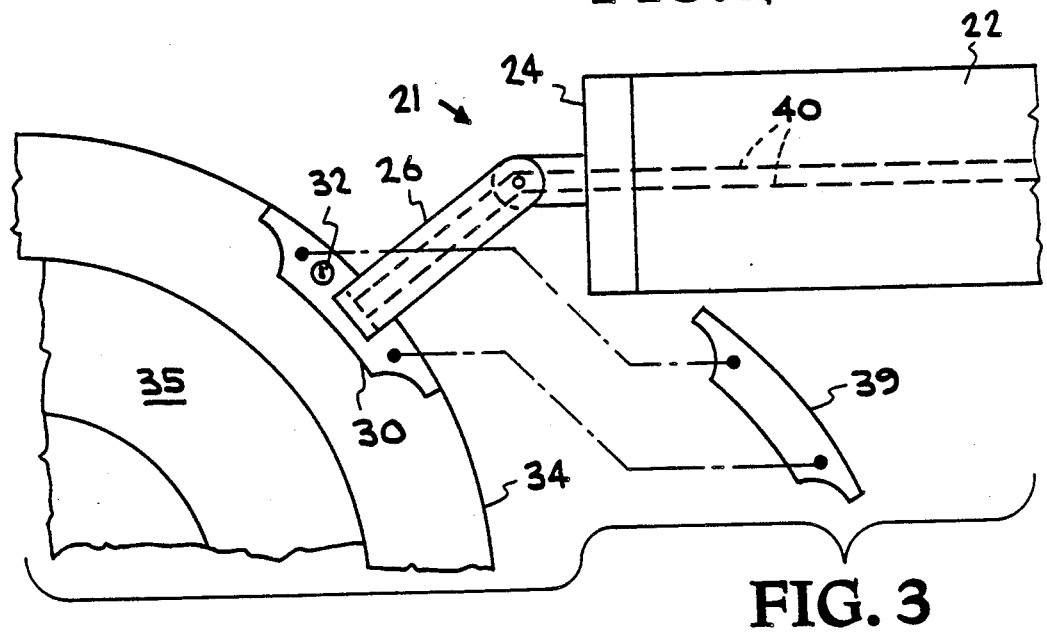
FIG. 3 is a side view of the side guard attached to the locking mechanism.
Figure 4A:
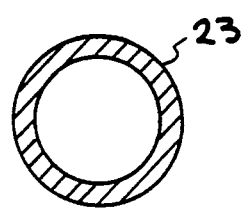
FIGS. 4A, B are sectional views of tubular and D-shaped guards.
Figure 4B:
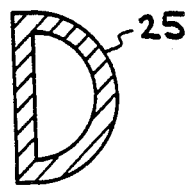

As shown in FIGS. 2 and 3, body guard 22 is typically a belt of plastic, rubber or other suitable material, although other designs such as a tubular or "D"-shaped guard 23 or 25 as shown in FIGS. 4A, B could also be used. Guard 22 is connected to the vehicle through attachment means 21. The end of guard 22 is attached to a clamp 24. The clamp 24 is attached to one end of a pivoting arm 26 which has a connection member or flange 28 extending substantially at right angles from the other end. Connection member 28 engages securing means 30, which includes a locking mechanism of any suitable known type, which is unlocked or released through keyhole 32. The connection member 28 is preferably a simple flat element of suitable shape which fits into the locking mechanism in securing means 30 much like the means for fastening a seatbelt. Other bar or rod shaped elements with suitable grooves or notches could also be used; the lock mechanism could alternately be built into the connection member 28 as shown by keyhole 33 in FIG. 2, with securing means 30 providing a receptacle for connection member 28. The connection member 28 fits into securing means 30 in a particular orientation so that guard 22 is at the desired height on the vehicle; securing means 30 have been mounted in wheel well 34, e.g. by bolts or rivets, at the appropriate position. Securing means 30 are small and do not interfere with tire 35.

When attached to securing means 30, the guard 22 is held close to side 36 of the vehicle. Pads 38 of rubber or other nonabrasive material can be placed on the back side of clamp 24 where it contacts side 36 of the vehicle so the vehicle is not damaged at the point of contact. Depending on the specific design of guard 22 and the contour of side 36, there may be a space between guard 22 and side 36, or guard 22 may make rubbing contact with side 36, but the only physical connection of guard 22 to the vehicle is at its ends. The belt may be wide enough and positioned to provide maximum protection for the vehicle. A similar securing means with locking mechanism may be utilized at the other end of the guard 22 in the other wheel well, or a simpler attachment means, e.g. a "T" in a slot, may be used since a lock at one end may be sufficient. The securing means could be recessed within the vehicle body itself, instead of placed in the wheel wells, in an unobtrusive manner, i.e. accessible through narrow slots with retractable covers. The lock mechanism could be electrically actuated by an electrical vehicle locking system, i.e. the lock is released electrically when the door is unlocked, e.g. by electrical connection 46 from door lock 44 to securing means 18 as shown in FIG. 1, or to securing means 30 as shown in FIG. 2. When not in use, the guard with its attachment hardware can simply be rolled up and placed in the trunk. A simple cover or mud guard 39 can be placed over securing means 30 when not in use so dirt from the road does not get into the assembly. Cover 39 may be mounted by push-in studs which engage securing means 30 or may be pivotably mounted thereto.

The protective guard could also form a part of a security system by including electrical circuit means which form a part of the alarm system circuit, e.g. electrical wires 40 in guard 22 which make electrical contact with an alarm system 42 through securing means 30.

Accordingly, the invention provides a protective side guard which is easy to attach and easy to remove and store. The small recessed securing means in the wheel wells or elsewhere within the vehicle body are inocuous when the guard is removed. The side guard is not dependent on the weather for its use. The lock mechanism is effective and easy to use. The length of the guard is adjustable for the size of the car but the rest of the hardware is the same for all vehicles.

Changes and modifications in the specifically described embodiments can be carried out without departing from the scope of the invention which is intended to be limited only by the scope of the appended claims.

I claim:

1. Apparatus for protecting the side of a vehicle, comprising:
    a protective guard of elongated shape with two ends;
    guard attachment means secured at the ends of the protective guard, the guard attachment means comprising clamp means attached to an end of the protective guard, a pivoting arm pivotably attached to one end to the clamp means, and a connection member extending substantially at right angles from the other end of the pivoting arm;
    recessed securing means mounted in the vehicle and recessed from the side surface which releasably engage the connection member of the guard attachment means for mounting the protective guard along the side of the vehicle at a height determined by the length of the protective guard, position of the securing means, length of the pivoting arm and angle of the pivoting arm to the protective guard;
    electrical circuit means formed in the protective guard which connect to a security alarm system.

2. Apparatus of claim 1 further comprising locking means positioned in the securing means for locking the connection member of the guard attachment means to the securing means.

3. Apparatus of claim 1 further comprising locking means positioned in the connection member of the guard attachment means for locking the connection member of the guard attachment means to the securing means.

4. Apparatus of claim 1 wherein the securing means are mounted in the wheel wells of the vehicle.

5. Apparatus of claim 1 wherein the securing means are mounted in recesses formed in the vehicle body sides.

6. Apparatus of claim 1 wherein the protective guard comprises a belt.

7. Apparatus of claim 6 wherein the belt is formed of rubber of plastic.

8. Apparatus of claim 1 wherein the protective guard comprises a tubular molding.

9. Apparatus of claim 1 further comprising a removable protective cover which fits over the securing means when the connection member of the guard attachment means is disengaged from the securing means.

10. Apparatus for protecting the side of a vehicle, comprising:
    a substantially elongated protective guard having first and second ends;
    first and second guard attachment means secured to the respective first and second ends of the protective guard, at least one of said first and second guard attachment means comprising clamp means attached to an end of the protective guard, a pivoting arm pivotably attached to one end of the clamp means, and a connection member extending substantially at right angles from the other end of the pivoting arm;
    first and second recessed securing means mounted in the vehicle and recessed from the side surface which releasably engage the first and second guard attachment means in a predetermined position along the side of the vehicle;
    locking means electrically actuated by an electrical vehicle locking system for locking at least one of the first and second guard attachment means to its respective securing means.

11. Apparatus of claim 10 wherein the locking means are formed in the securing means.

12. Apparatus of claim 10 wherein the protective guard comprises a belt.

13. Apparatus of claim 10 wherein the first and second securing means are mounted in the wheel wells of the vehicle.

14. Apparatus for protecting the side of a vehicle, comprising:
    a substantially elongated protective guard having first and second ends;
    first and second guard attachment means secured to the respective first and second ends of the protective guard, at least of said first and second guard attachment means comprising clamp means attached to an end of the protective guard, a pivoting arm pivotably attached to one end of the clamp means, and a connection member extending substantially at right angles from the other end of the pivoting arm;

first and second recessed securing means mounted in the vehicle and recessed from the side surface which releasably engage the first and second guard attachment means in a predetermined position along the side of the vehicle;

locking means for locking at least one of the first and second guard attachment means to its respective securing means;

electrical circuit means formed in the protective guard which connect to a security alarm system.

15. Apparatus of claim 14 wherein the protective guard comprises a belt.

16. Apparatus of claim 14 wherein the first and second securing means are mounted in the wheel wells of the vehicle.

17. Apparatus of claim 10 further comprising non-abrasive pads attached to the clamp means to contact the vehicle side.

18. Apparatus of claim 14 wherein the locking means are formed in the securing means.

19. Apparatus of claim 14 wherein the locking means are formed in the guard attachment means.

* * * * *